United States Patent [19]

Kuriki

[11] 4,317,959
[45] Mar. 2, 1982

[54] SPEECH CONTROL CIRCUIT

[75] Inventor: Shigeya Kuriki, Tokyo, Japan

[73] Assignee: OKI Electric Industry Co., Ltd., Tokyo, Japan

[21] Appl. No.: 129,714

[22] Filed: Mar. 12, 1980

[30] Foreign Application Priority Data

Mar. 26, 1979 [JP] Japan .................................. 54-34283

[51] Int. Cl.³ ............................................. H04M 1/60
[52] U.S. Cl. ................................ 179/1 VC; 179/81 B
[58] Field of Search ............... 179/1 HF, 1 VC, 81 B, 179/170.6, 170.8

[56] References Cited

U.S. PATENT DOCUMENTS 3,751,602  8/1973  Breeden ........................... 179/81 B Primary Examiner—Bernard Konick
Assistant Examiner—J. A. Popek
Attorney, Agent, or Firm—Martin Novack

[57] ABSTRACT

A speech control circuit is disclosed for use in a loudspeaker telephone or a handsfree telephone having a microphone and a speaker, and provides the correct switching of the transmission mode and the reception mode in spite of acoustic coupling between the speaker and the microphone. The disclosed circuit reduces errors in the switching operation and helps to prevent the problem of "noise block".

1 Claim, 12 Drawing Figures

SPEECH CONTROL CIRCUIT

BACKGROUND OF THE INVENTION

The present invention relates to a speech control circuit, and, in particular, relates to such a circuit which is utilized in a loudspeaker telephone or a handsfree telephone having a microphone and a speaker, and provides the correct switching of the transmission mode and the reception mode in spite of the acoustic coupling between the speaker and the microphone.

A loudspeaker telephone has a transmission circuit which transmits a signal from a microphone to a circuit line, and a reception circuit which receives the signal from the circuit line and energizes a speaker. Both the transmission circuit and the reception circuit have variable insertion loss circuits, or varialossers which are controlled by a speech control circuit, so that when a man speaks to a microphone, the insertion loss in the reception circuit is large and the insertion loss in the transmission circuit is small, and when the reception signal from the circuit line exists, the insertion loss in the reception circuit is small and the insertion loss in the transmission circuit is large. Thus, the transmission mode and the reception mode are substantially switched by a speech control circuit according to the transmission signal and the reception signal.

In a speech control circuit, three operational modes are defined. "Static mode" is the mode that no transmission signal nor reception signal exists. "Reception mode" is the mode that the reception signal from the circuit line exists, but no transmission signal exists. "Transmission mode" is the mode that the transmission signal from a microphone exists, but no reception signal from the circuit line exists.

In a static mode, when a reception signal from the circuit line is provided, that signal is acoustically generated from a speaker, and then, the acoustic signal from the speaker is applied to a microphone through the air space between the speaker and the microphone. Therefore, the speech control circuit will detect the transmission signal, even though only the reception signal is applied. In this case the speech control circuit must be composed so that the level of the reception signal is higher than the level of the transmission signal. Otherwise, the system would be switched to the transmission mode by the reception signal. That situation is called "error by acoustic coupling". In particular, when both a microphone and a speaker are mounted in a single housing, the acoustic coupling between a microphone and a speaker is rather large, so that error by acoustic coupling has been a serious problem.

A prior speech control circuit for preventing the acoustic coupling is shown in FIG. 1.

In the figure, the transmission speech signal generated in a microphone M is amplified by a microphone amplifier MA, the output of which is applied to a hybrid circuit MYB which converts a four wire signal to a two wire signal and vice versa, through a transmit variolosser TVL, which is a variable attenuator. Also, the reception signal from the transmission line is applied to a speaker SP through the hybrid circuit HYB, a receive variolosser RVL and a speaker amplifier SA. The acoustic signal generated by the speaker is dispersed in the air. The hybrid circuit functions to transmit the output of the transmit variolosser to the line, and the signal on the line to the input of the receive variolosser. In an ideal condition, the output of the transmit variolosser does not leak to the input of the receive variolosser. However, in an actual hybrid circuit, some small ratio $\beta$ of the output of the transmit variolosser leaks to the input of the receive variolosser. That leak in the hybrid circuit is an important factor in analyzing the operation of the speech control circuit.

The speech control operation in the above circuit will be described below.

The speech signal from the microphone M is obtained at the output of the microphone amplifier MA. The output of the microphone amplifier MA is further amplified by the transmit control amplifier AT, the output voltage $V_t'$ of which is applied to the comparator COMP. Similarly, the received speech signal from the line is picked up at the output (a) of the hybrid circuit HYB and the output (b) of the speaker amplifier SA, and those outputs are amplified by the first reception control amplifier $AR_1$ and the second reception control amplifier $AR_2$, respectively. The outputs of those reception control amplifiers $AR_1$ and $AR_2$ are combined or added to each other by the adder R, and the output voltage $V_r'$ of said adder R is applied to the comparator COMP.

The comparator COMP compares the voltage $V_t'$ with the voltage $V_r'$, and switches the operational mode between the transmission mode and the reception mode through the control of the insertion loss in the transmit variolosser TVL and the receive variolosser RVL according to the result of the comparison. That is to say, when $V_t' \geq V_r'$ is satisfied, the mode is determined as the transmission mode, and the insertion loss of the transmit variolosser TVL is controlled so as to be small or preferably zero, and the insertion loss of the receive variolosser RVL is controlled so as to be large. On the other hand, when $V_t' < V_r'$ is satisfied, the mode is determined as the reception mode, and the insertion loss of the transmit variolosser TVL is controlled so as to be large, and the insertion loss of the receive variolosser RVL is controlled so as to be small.

The comparator COMP controls the operational mode to the reception mode when both $V_t'$ and $V_r'$ are lower than the predetermined value.

The gain of the first reception amplifier $AR_1$ is relatively small, and the gain of the second reception amplifier $AR_2$ is relatively large. The reason for that is described below.

When the speech signal is received from the line, the speech signal is converted to an acoustic signal by the speaker SP. The acoustic signal is then applied to the microphone M through the air space with the loss $\alpha$. The signal thus applied to the microphone M is re-converted to an electric signal, which is applied to the microphone amplifier MA and the transmission amplifier AT. And the output voltage $V_t'$ of the transmission amplifier AT is applied to the comparator COMP. Of course, the reception signal is also amplified by the first reception amplifier $AR_1$ and the second reception amplifier $AR_2$, and the adder provides the combined output voltage $V_r$. In this case, in order to keep the reception mode, the relationship $V_r' > V_t'$ must be satisified. In order to satisfy the above relationship, the gain of the second reception control amplifier $AR_2$ must be larger than the difference between the sum of the sensitivity of the microphone M, the gain of the microphone amplifier MA and the gain of the transmission control amplifier AT; and the acoustic loss $\alpha$. Therefore, the gain of the second reception control amplifier $AR_2$ must be relatively large.

In this case, if the gain of the first reception control amplifier $AR_1$ is large, instead of the second reception control amplifier $AR_2$, the error by the side tone $\beta$ in the hybrid circuit HYB occurs. That is to say, the output of the transmit variolosser TVL leaks to the input of the reception variolosser RVL through the side tone $\beta$ of the hybrid circuit HYB, because the hybrid circuit HYB is not an ideal one. Said side tone would be amplified by the first reception control amplifier $AR_1$, which would provide the high level of $V_r'$, thus, the mode would be switched to the reception mode although the correct mode is the transmission mode. Therefore, the gain of the first reception control amplifier $AR_1$ must be low so that the system does not operate incorrectly due to the side tone $\beta$ of the hybrid circuit in the transmission mode. Also, the gain of the first reception control amplifier $AR_1$ must be enough to switch the mode from the transmission mode to the reception mode when the reception signal appears at the input (a) of the reception variolosser RVL during the transmission mode. Since, the level of the reception signal is usually high, the gain of the first reception control amplifier $AR_1$ can be low. Due to the presence of the first reception control amplifier $AR_1$, the mode can be changed quickly and the omission of the beginning of the received speech is prevented when the mode changes from the transmission mode to the reception mode.

The above operations are summarized as follows.

(a) In a static mode, both the levels $V_t'$ and $V_r'$ are low, and the comparator COMP determines the mode to be the reception mode.

(b) In a transmission mode, the relationship $V_t' \geq V_r'$, is satisfied; thus, the attenuation by the transmit variolosser TVL is low and the attenuation by the receive variolosser RVL is high.

(c) In a reception mode, the relationship $V_t' < V_r'$ is satisfied, and thus, the attenuation of the transmit variolosser TVL is high, and the attenuation of the receive variolosser RVL is low. In this case, in order to prevent error through acoustic coupling, the gain of the second reception control amplifier $AR_2$ must be sufficiently high.

(d) When a reception signal appears during the transmission mode, that reception signal is amplified by the first reception control amplifier $AR_1$, which provides the level of $V_r'$ higher than $V_t'$, and thus, the operational mode is quickly switched from the transmission mode to the reception mode.

However, the prior speech control circuit shown in FIG. 1 has the following two disadvantages.

(1) The addition by the adder R is carried out for the alternate waveforms. However, since the phase of the output of the first reception control amplifier $AR_1$ does not completely coincide with that of the second reception control amplifier $AR_2$, the sum ($V_r$) of the adder R is not high enough. FIG. 2(a) shows the case where the phase of the first reception control amplifier $AR_1$ coincides completely with that of the second reception control amplifier $AR_2$, and the sum $V_r'$ at the output of the adder R is sufficiently high. On the other hand, FIG. 2(b) shows a case where there exists the phase difference or the time delay $\tau$ between the outputs of the first reception control amplifier $AR_1$ and the second reception control amplifier $AR_2$. In this case, it is apparent that the level of the output of the adder R is considerably lower than that of the case of FIG. 2(a). That time delay $\tau$ is caused by the propagation time in the reception variolosser RVL and the speaker amplifier SA. The resultant sum $V_r'$ at the output of the adder R is sometimes reduced almost to zero depending upon the operational frequency. The reduction of that level $V_r'$ causes the error in the operation of the switching.

(2) The system sometimes operates incorrectly due to the noise from the circuit line. That is to say, since the gain of the second reception control amplifier $AR_2$ is very high as mentioned above, noise from the circuit line is also amplified by said second reception control amplifier $AR_2$ enough to provide the relationship $V_r' \geq V_t'$. If that situation occurs, the system is switched incorrectly by the noise. That incorrect operation is called a noise block.

SUMMARY OF THE INVENTION

It is an object, therefore, of the present invention to overcome the disadvantages and limitations of a prior speech control circuit by providing a new and improved speech control circuit.

It is also an object of the present invention to provide a speech control circuit which can switch the transmission mode and the reception mode correctly, and can get rid of the so-called noise block.

The above and other objects are attained by a speech control circuit comprising a microphone (M) for converting an acoustic signal to an electrical signal, a microphone amplifier (MA) for the amplification of the output of the microphone, a transmission control amplifier (AT) connected to the output of the microphone amplifier, a transmit variolosser (TVL) connected to the output of the microphone amplifier for providing variable attenuation, a receive variolosser (RVL), a hybrid circuit (HYB) connected to the output of the transmit variolosser, the input of the receive variolosser, and a transmission line, a speaker amplifier (SA) connected to the output of the receive variolosser, a speaker (SP) connected to the output of the speaker amplifier for converting an electric signal to an acoustic signal, a first reception control amplifier ($AR_1$) connected to the input of the receive variolosser, a second receive control amplifier ($AR_2$) connected to the output of the speaker amplifier, a comparator (COMP) for comparing the output $V_t$ of the transmission control amplifier and the received signal level $V_r$ which is the sum of the outputs of the first and the second reception control amplifiers, said comparator controlling the variolossers so that when $V_t \geq V_r$ is satisfied, the attenuation in the transmit variolosser is small and the attenuation in the reception variolosser is large, and when $V_t < V_r$ is satisfied or the values $V_t$ and $V_r$ are lower than the predetermined value, the attenuation in the transmit variolosser is large, and the attenuation in the reception variolosser is small. The speech control circuit further comprises, a first rectification and integration circuit provided at the output of the first reception control amplifier, a second rectification and integration circuit provided at the output of the second reception control amplifier, a third rectification and integration circuit provided at the output of the transmission control amplifier for providing the transmission level $V_t$ to the comparator, a differentiation circuit provided at the output of said second rectification and integration circuit, and means for providing the sum of the output of the differentiation circuit and the output of the first rectification and integration circuit for providing the received signal level $V_r$ to the comparator.

BRIEF DESCRIPTION OF THE DRAWINGS

The foregoing and other objects, features, and attendant advantages of the present invention will become better understood by means of the following description and accompanying drawings wherein.

DESCRIPTION OF THE PREFERRED EMBODIMENT

Figure 3:
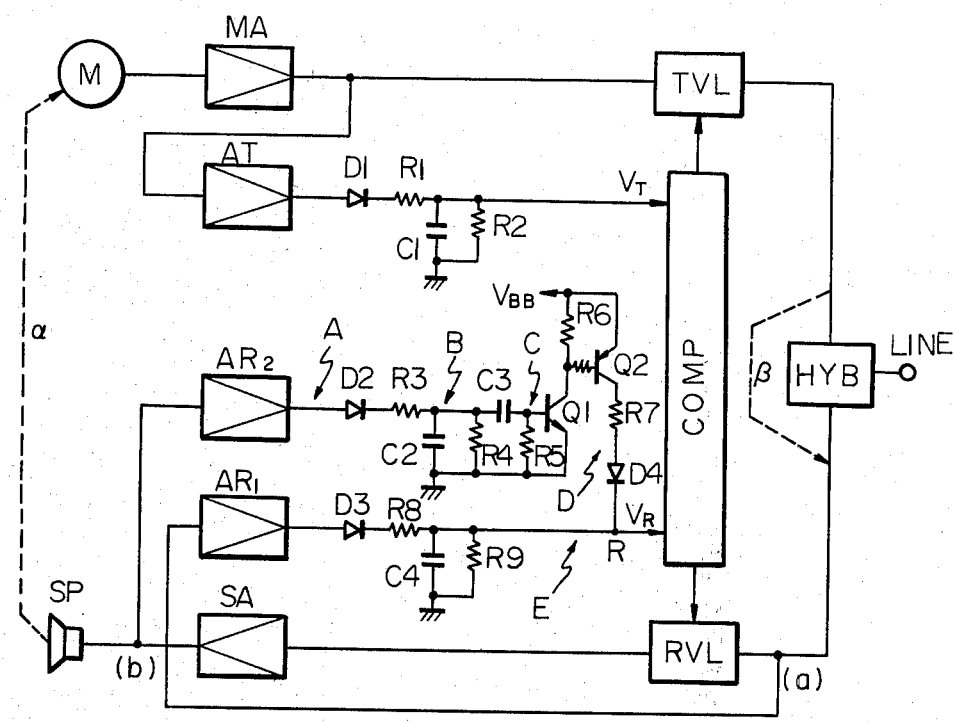
FIG. 3 is the circuit diagram of the speech control circuit according to the present invention.

FIG. 3 shows the circuit diagram of the present speech control circuit.

In the figure, the symbol M is a microphone, MA is a microphone amplifier, TVL is a transmit variolosser which is inserted in the speech transmission circuit, HYB is a hybrid circuit which connects the four wire circuit to the two wire circuit, RVL is a receive variolosser circuit which is inserted in the speech reception circuit, SA is a speaker amplifier which is connected to the output of said receive variolosser RVL. The variolossers TVL and RVL are variable attenuators, having a rise time constant less than 10 mS, and a fall time constant 250-300 mS. The rise time constant defines the speed of reducing the attenuation, and the fall time constant defines the speed of increasing the attenuation. The SP is a speaker, AT is the transmission control amplifier for amplifying the output of said microphone amplifier MA, $AR_1$ is the first reception control amplifier for amplifying the output of said hybrid circuit HYB, $AR_2$ is the second reception control amplifier which amplifies the output of said speaker amplifier SA, COMP is a comparator, which compares the received signal level $V_r$ with the transmission signal level $V_t$ and controls attenuation of both said transmit variolosser TVL and the receive variolosser RVL according to the result of the comparison. The symbols $D_1$, $D_2$, $D_3$ and $D_4$ are diodes, $R_1$, $R_2$, $R_3$, $R_4$, $R_5$, $R_6$, $R_7$, $R_8$ and $R_9$ are resistors, $C_1$, $C_2$, $C_3$ and $C_4$ are capacitors, $Q_1$ and $Q_2$ are transistors.

The diode $D_3$, the resistors $R_8$ and $R_9$, and the capacitor C connected at the output of the first reception control amplifier $AR_1$ compose the first rectification and integration circuit. The diode $D_2$, the resistors $R_3$ and $R_4$, and the capacitor $C_2$ connected at the output of the second reception control amplifier $AR_2$ compose the second rectification and integration circuit. Those rectification and integration circuits rectify the output of the reception control amplifiers $AR_1$, and $AR_2$, and provide the envelope waveforms of the respective speech signals.

Further, the third rectification and integration circuit having the diode $D_1$, the resistors $R_1$ and $R_2$, and the capacitor $C_1$ is provided at the output of the transmission control amplifier AT, and provides the envelope waveform of the transmission speech signal by rectifying the output of the amplifier AT. The rectified envelope signal is applied to the comparator COMP as the transmission signal level $V_t$.

At the output of the second rectification and integration circuit, the differentiation circuit having the capacitor $C_3$ and the resistor $R_5$ is provided, and the output of said differentiation circuit controls the ON/OFF status of the first transistor $Q_1$. Also, the conduction of the first transistor $Q_1$ causes the conduction of the second transistor $Q_2$. When the second transistor $Q_2$ is conductive, the electric current flows from the power source $V_{BB}$ through the second transistor $Q_2$, the resistor $R_7$ and the diode $D_4$ to the output of the first rectification and integration circuit. The junction point of the first rectification and integration circuit and the diode $D_4$ is connected to the $V_r$ input of the comparator COMP, and provides the reception level of the speech signal.

Figure 1:
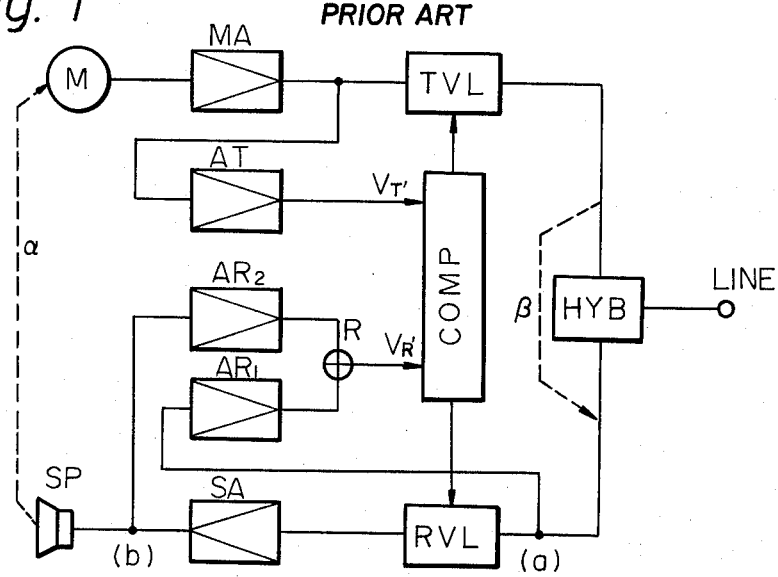
FIG. 1 is the circuit diagram of a prior speech control circuit.

Accordingly, it should be noted that a feature of the present circuit is the presence of the first, second, and third rectification and integration circuit, the differentiation circuit, and the switching circuits with the transistors $Q_1$ and $Q_2$. Also, it is a feature of the present invention that the input signals $V_t$ and $V_r$ of the comparator COMP are the envelope waveforms of the speech signals, instead of the alternate signals of FIG. 1.

Figure 4:
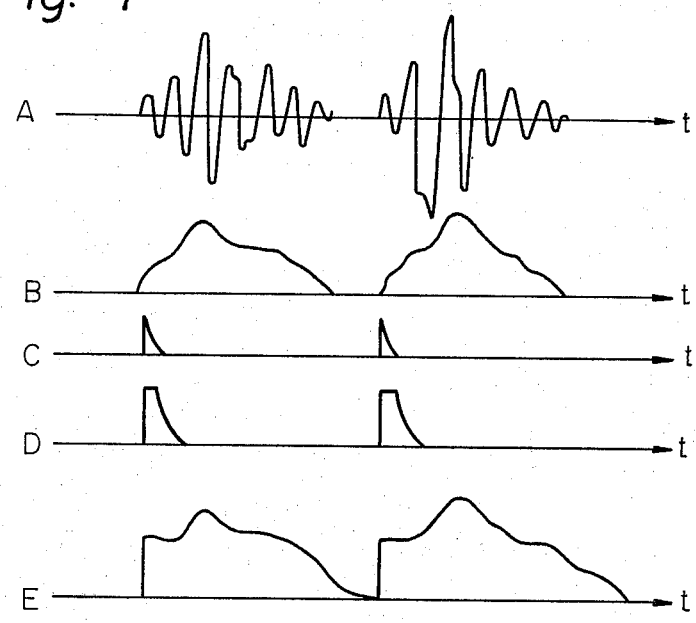
FIGS. 4A to 4E show the speech waveforms for the explanation of the operation of the speech control circuit in FIG. 3, and FIGS. 5A to 5C show the other speech waveforms for the explanation of the operation of the speech control circuit in FIG. 3.

The operation of the circuit of FIG. 3 is explained in accordance with the waveforms in FIG. 4. In FIG. 4, the waveforms A, B, C, D and E show the operational waveforms at the points of the same symbols in the circuit of FIG. 3. That is to say, the waveform A shows the received speech signal at the output of the second reception control amplifier $AR_2$, B is the envelope waveform of the speech signal A and shows the output waveform of the second rectification and integration circuit, and C is the differentiated waveform of the waveform B by the differentiation circuit having the capacitor $C_3$ and the resistor $R_5$. The waveform D is the waveform of the output of the first transistor $Q_1$, which is conducted by said differentiated waveform C. The waveform E is the combined waveform of the waveform B which is the envelope of the output of the first reception control amplifier $AR_1$ and the waveform of D.

Figure 2:
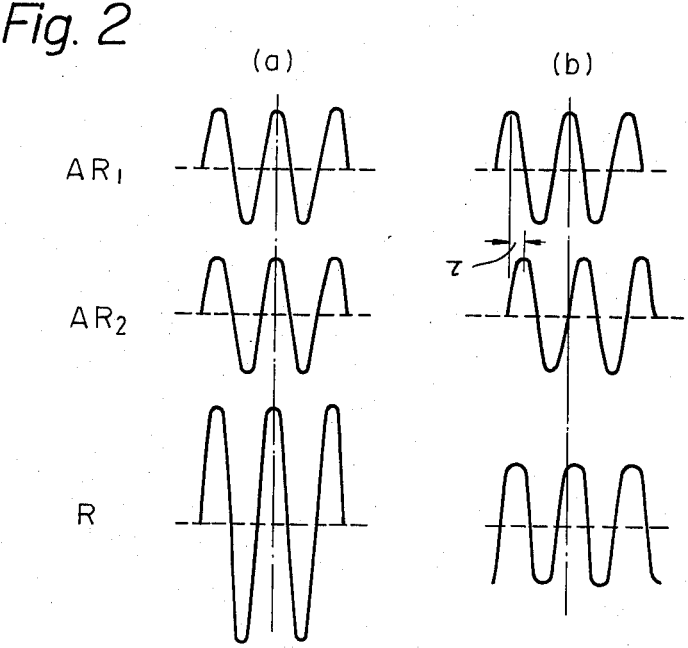
FIGS. 2(a) and 2(b) show the speech waveforms for the explanation of the operation of a prior speech control circuit.

As described above, the input signals $V_t$ and $V_r$ of the comparator COMP are the envelopes of the speech signals, but are not the instantaneous alternate signals. Therefore, there is no problem concerning the phase difference or the time delay between the outputs of the first and the second reception control amplifiers as described in accordance with FIG. 2.

Figure 5:
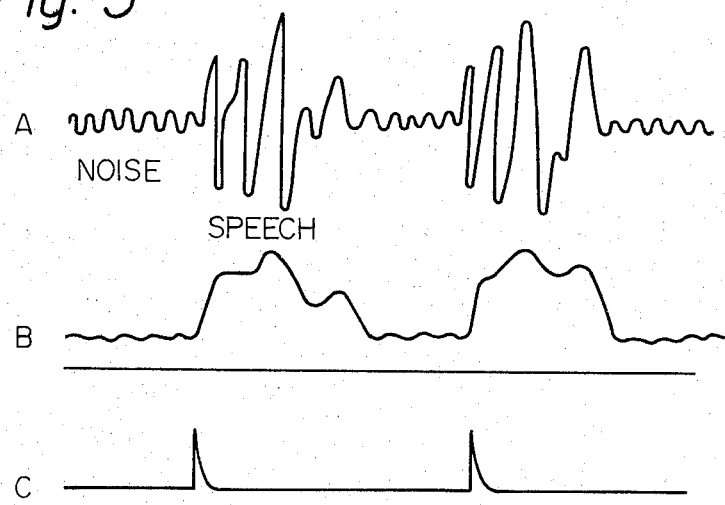

The waveforms of FIG. 5 show the improvement of the noise block condition according to the present invention. Assuming that the received speech signal has both the noise component with the constant level and the real speech signal the amplitude of which changes with the large amplitude, as shown in A of FIG. 5, the output waveform of the second rectification and integration circuit connected at the output of the second reception control amplifier $AR_2$ is as shown in FIG. 5 (B), in which the noise component has almost a constant level, and the real speech component has an envelope with a large amplitude. By differentiating the waveform B through the differentiation circuit with the capacitor $C_3$ and the resistor $R_5$, the waveform C is obtained in which a pulse signal with a large amplitude is generated at the beginning point of the real speech signal, and no pulse signal is generated by the noise component. Accordingly, the effect of the noise is deleted in the reception level $V_r$ which is applied to the comparator COMP, and thus, the present circuit can get rid of the incorrect operation caused by the noise. It should be noted that the waveforms A, B and C of FIG. 5 are related to the points A, B and C of the circuit of FIG. 3.

As described above in detail, the present invention can improve the stability of the operation of a speech control circuit, in particular, the present circuit can get rid of the effect of the phase difference between the two outputs of the reception control amplifiers, and the noise block.

From the foregoing it will now be apparent that a new and improved speech control circuit has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A speech control circuit for a loudspeaker telephone comprising a microphone (M), a microphone amplifier (MA) for the amplification of the output of the microphone, a transmission control amplifier (AT) connected to the output of the microphone amplifier, a transmit variolosser (TVL) connected to the output of the microphone amplifier for providing variable attenuation, a receive variolosser (RVL), a hybrid circuit (HYB) connected to the output of the transmit variolosser, the input of the receive variolosser, and a transmission line, a speaker amplifier (SA) connected to the output of the receive variolosser, a speaker (SP) connected to the output of the speaker amplifier for converting an electric signal to an acoustic signal, a first reception control amplifier ($AR_1$) connected to the input of the receive variolosser, a second reception control amplifier ($AR_2$) connected to the output of the speaker amplifier, a comparator (COMP) for comparing an output $V_t$ of the transmission control amplifier and a received signal level $V_r$ which is the sum of the outputs of the first and the second reception control amplifiers, said comparator controlling the variolossers so that when $V_t \geq V_r$ is satisfied, the attenuation in the transmit variolosser is small and the attenuation in the reception variolosser is large, and when $V_t < V_r$ is satisfied or the values $V_t$ and $V_r$ are lower than the predetermined value, the attenuation in the transmit variolosser is large, and the attenuation in the reception variolosser is small, characterized in that a first rectification and integration circuit is provided at the output of the first reception control amplifier, a second rectification and integration circuit is provided at the output of the second reception control amplifier, a third rectification and integration circuit is provided at the output of the transmission control amplifier for providing the transmission level $V_t$ to the comparator, a differentiation circuit is provided at the output of said second rectification and integration circuit, and means for providing the sum of the output of the differentiation circuit and the output of the first rectification and integration circuit is provided for providing the received signal level $V_r$ to the comparator.

* * * * *